Patented Nov. 8, 1938

2,136,154

UNITED STATES PATENT OFFICE 2,136,154

PROCESS OF CONSERVING ROASTED COFFEE

Max Specht, Hamburg, Germany

No Drawing. Application June 9, 1937, Serial No. 147,386. In France June 9, 1936

6 Claims. (Cl. 99—68)

This invention relates to a process of conserving roasted coffee, preferably in evacuated containers.

The yield of roasted coffee depends upon the manner of preparing the infusion and, to a certain extent, upon the intensity of roasting. In some countries there is a preference for dark-roasted coffees which are more thoroughly loosened or disintegrated by the roasting process and consequently furnish a somewhat larger content of water-soluble extractable matter with the result that the infusion thereof is stronger and has more body than that of coffees of the same kind but of lighter colour because less roasted. Although the aroma and the characteristic features of the finer kinds of coffee are better retained with light roasting, these lightly roasted coffees are not so productive as the dark-roasted coffees, and, furthermore, an infusion thereof requires a larger quantity of ground coffee to attain the same amount of body. Dark-roasted coffees suffer on the other hand from the drawback that they sweat very easily and that the surface of the beans becomes gradually coated with oily spots which render the coffee unsightly and affect its taste as the exuded oil, in the presence of air and moisture, readily oxidizes and becomes rancid. Coffee of this class tastes musty and flat when served.

It has been attempted to overcome this drawback by enclosing the roasted beans airtightly or packing them in more or less exhausted containers, but it was found that sweating of the beans could not be prevented thereby. Coffee packed in a vacuum will soon become subjected to normal pressure or even superatmospheric pressure, which will cause swelling of the kind well known in the case of airtight packed coffee. In exhausted containers the thoroughly roasted substance of the beans gradually gives off moisture and volatile roasting products which easily evaporate in the evacuated space and finally lead to super-pressure.

Vacuum packing, however, possesses considerable advantages with respect to the keeping qualities of roasted coffees, and particularly their aroma, since it prevents the admission of moisture and oxygen and all their resulting detrimental effects upon the roasted beans, so that these coffees can be kept fresh for months even in subtropical countries without displaying the known ageing, weakness of the infusion, chicory taste, etc.

Experiments have shown that roasted coffee will keep sufficiently in evacuated containers if the beans are not thoroughly roasted. Experiments have shown that, for instance, a normally fully roasted Kenya coffee furnishes an extractable content of 29.4%. Coffee of this kind tended to sweat and even in a vacuum packing did not keep sufficiently, while the same coffee with 28.9% of extractable contents had sufficient keeping qualities. However, if the roasting process was carried out only a few minutes longer, the extractable contents decreased to 27.3% or 27.2%, but these samples also failed to keep sufficiently in a vacuum packing. On the other hand, a roasted Santos coffee of 25.8% extractable content, which was kept for three months in a vacuum packing, was found to be wet and had a flat and stale taste, whereas the same coffee having 25.9% extractable contents and subjected to the same storing conditions felt dry and had a good taste when served.

This comparison indicates that extractable contents do not furnish a sure criterion for the keeping qualities of a roasted coffee.

Further experiments made in this connection produced the surprising result that the behaviour of the chlorogenic acid contained in every coffee during roasting furnishes a useful indication for the degree of roasting required to attain sufficient keeping qualities.

To insure good keeping qualities according to the invention I roast the beans only to a chlorogenic acid content corresponding approximately to the average between the values found in green and fully roasted coffees of the same kind, and I subject said coffee to a ripening process of longer duration (e. g. 8 to 10 hours) and subject it further to a vacuum treatment in combination with a pressure treatment by inert gases.

The determination of the extractable contents in roasted coffee is effected preferably according to the method of Trillich (Bujard-Bayer's Hilfsbuch für Nahrungsmittelchemiker, Berlin 1920, Fourth Edition, page 314) in the following manner:

Over 10 grams of air dry ground coffee in a glass or a brass beaker having a capacity of 400 cubic centimetres there are poured 200 cubic centimetres of water, weighed with a glass rod. The mixture is then heated to boiling point and kept at boiling point with continuous stirring for five minutes; after cooling the beaker is filled up to the original weight, and filtration is effected; the filtrate is concentrated to 25 cubic centimetres and dried in a steam drying cabinet. The result is reckoned in relation to 100 grams of coffee.

The caffeine content is determined by the method of K. Lendrich and E. Nottbohm (page 315 of the previously mentioned Hilfsbuch).

Of the well mixed finely ground coffee 20 grams are placed in a suitable glass beaker with 10 cubic centimetres of 10% ammonia solution, and immediately well mixed. The well soaked coffee is left with the glass beaker covered, in case green coffee is used, with intermittent stirring, for two hours' infusion or otherwise for infusion for one hour. Then the ground coffee is mixed with 20 to 30 grams of coarse grained quartz powder and extracted in an extraction tube (33 x 94 centimetres) in the Soxhlet apparatus with carbon tetrachloride for three hours. The heating of the extraction flask is effected on a wire gauze.

The extract of coffee obtained on extraction is mixed with about 1 gram of solid paraffin, freed by distillation from the carbon tetrachloride, and then extracted first with 50 and then three times on each occasion with 25 cubic centimetres of hot water. The filtrate cooled to room temperature is filtered by means of a moistened filter, care being taken to prevent solidified paraffin particles from passing on to the filter; finally after-washing is effected with boiling water.

The aqueous extract amounting to about 200 cubic centimetres and cooled to room temperature is mixed in the case of green coffee with 10 and in the case of roasted coffee with 30 cubic centimetres of a 1% solution of potassium permanganate and allowed to stand for fifteen minutes. In order to effect separation of the manganese there is then added in drops a solution of peroxide of hydrogen of about 3% strength which contains glacial acetic acid in the proportion of 1 cubic centimetre to 100 cubic centimetres solution. For roasted coffee as a rule there are required 2 to 3 cubic centimetres of hydrogen peroxide; for green coffee which takes only relatively small quantities of permanganate rather more.

The flask is then placed for about a quarter of an hour on a boiling water bath, the separated matter gradually settling to the bottom, the liquid is filtered hot, and the filter washed with hot water. The entirely clear filtrate obtained is best evaporated to dryness in a glass saucer on the water bath.

The clear solutions obtained after the treatment with permanganate are perfectly colourless in the case of green coffee, but in the case of roasted coffee are coloured wine yellow. The aqueous solution is concentrated to about 50 cubic centimetres and the caffeine is extracted by repeated shaking with chloroform, and after evaporation of the chloroform is weighed.

The determination of the chlorogenic acid is effected after the method indicated in Chemikerzeitung 1932, page 991, as follows:—

2 grams of roasted and ground coffee are degreased with petroleum spirit in a reflux installation and the de-greased powder is dried at 70° C. The dried coffee is then boiled in the flask with 20 cubic centimetres of saturated solution of common salt and 2 cubic centimetres of water for fifteen minutes, and after settling the solution is poured into a flask of a capacity of 100 cubic centimetres. The powder is boiled with an additional 20 cubic centimetres as water for fifteen minutes and after settling the solution is added to the flask, and so on, until the 100 cubic centimetres mark is attained. The solution is then filtered through a kieselguhr filter. In the filtered solution the determination of the chlorogenic acid is effected colorimetrically as follows:—

5 cubic centimetres of the solution are diluted in the 100 cubic centimetres flask with 25 cubic centimetres of water. 0.5 cubic centimetre of saturated solution of sodium nitrite and 7 grams of urea are added and then 0.5 cubic centimetre of concentrated acetic acid. After standing for three minutes 5 cubic centimetres of soda lye are added and the whole is filled with water up to 100 cubic centimetres. The red solution is preferably colorimetered in the Leitz compensation colorimeter. As a test solution there is used an 0.1% solution of pure chlorogenic acid prepared exactly as above.

The practical application of this part of the process may be as follows:

Experience shows that there is no difficulty in knowing when a coffee is full roasted, as this state is indicated by its colour tone. This coffee and the green coffee used are then examined as to their chlorogenic acid content. Furthermore, several samples of the raw coffee are roasted less, and the chlorogenic acid content of these samples is also ascertained. Since the operator is in a position to stop roasting when a certain colour has been attained, he is supplied with a sample of roasted coffee, which has disclosed a chlorogenic acid content constituting approximately an average between that of the green and fully roasted coffees. No difficulty will then be involved in obtaining a coffee possessing the desired chlorogenic acid content and thus the requisite keeping qualities.

If it is not desired to rely on the experience of the operator in obtaining the fully roasted coffee, it is advisable to ascertain not only the chlorogenic acid content but also the extract contents of the various samples of roasted coffee, also in this case subjecting the coffee to a ripening process of longer duration and subjecting it further to a vacuum treatment in combination with a pressure treatment by inert gases.

The content of a roasted coffee of extractive substances is determined in accordance with the officially recognized Trillich method by boiling a certain quantity of coffee powder with water, permitting it to cool, filling up to the original weight, evaporating an aliquot part of the extract solution, drying the residue, and weighing. The beans are then roasted to a chlorogenic acid content constituting approximately the average between the content of the raw coffee and that of the roasted product having the maximum extract contents.

Test roasting required for determining the roasted coffee having a suitable chlorogenic acid content can be carried out in the usual test roasters found in every roasting establishment.

The conditions concerned are stated in the following examples.

*Example 1*

[The experiment was made with the Kenya coffee mentioned above]

| | Green coffee | Keeps, not fully roasted | Normally fully roasted | Does not keep, roasted slightly darker than normal | Roasted very dark |
|---|---|---|---|---|---|
| Extract contents determined according to Trillich | Percent | Percent 28.9 | Percent 29.4 | Percent 27.3 | Percent 27.2 |
| Caffeine content | | 1.28 | | 1.27 | |
| Chlorogenic acid content | 6.56 | 5.87 | 5.27 | 4.51 | 3.50 |

The table shows that the extract content increases with the roasting up to a certain degree of dark roasting, when it decreases again, while the chlorogenic acid content decreases constantly from an original maximum with increasing roasting.

The normal fully roasted coffee discloses a chlorogenic acid content of 5.27% and does not keep for any length of time even in a vacuum packing. On the other hand, the roasted coffee in the column on the left, which has a hardly appreciably reduced extract content, will keep and discloses a chlorogenic acid content of 5.87% i. e., about the average between the values found in the green coffee (6.56%) and those in the fully roasted coffee (5.27%), and is here practically accurately equal to the arithmetical mean, whilst the chlorogenic acid values ascertained with respect to the still more roasted samples in the righthand column decrease still more.

*Example 2*

[A Central American coffee having a chlorogenic acid content of 7.29 percent in the green state was roasted. Examination disclosed the following result]

|  | Green coffee | Keeps, not fully roasted | Does not keep, normally fully roasted |
| --- | --- | --- | --- |
|  | Percent | Percent | Percent |
| Extract |  | 26.56 | 27.97 |
| Chlorogenic acid content | 7.29 | 6.38 | 5.25 |

The average chlorogenic acid content of green and normally fully roasted coffee theoretically amounts to 6.27%. This is in harmony with the chlorogenic acid content of 6.38% actually ascertained in the roasted coffee that will keep.

*Example 3*

[A Mexican coffee having 5.72 percent chlorogenic acid content in the green state was roasted. Examination revealed the following result]

|  | Green coffee | Keeps, not fully roasted | Does not keep, normally fully roasted |
| --- | --- | --- | --- |
|  | Percent | Percent | Percent |
| Extract |  | 25.62 | 26.96 |
| Chlorogenic acid content | 5.72 | 4.53 | 3.43 |

The average content of chlorogenic acid of green and normally fully roasted coffee theoretically amounts to 4.51%. The content actually found in the fully roasted kind that will keep was 4.53%.

It is known that the coffee when being roasted becomes blown up by certain gaseous inclusions. These gases are set free when the roasted coffee is ground. The aroma of the ground coffee is impaired by such gases if the coffee is being conserved and it is fundamentally preferable to conserve roasted coffee in form of beans because it better keeps its aroma in such manner.

The invention proposes a process of conserving roasted coffee in form of beans at the same time excluding the deterioration of the aroma when the coffee is getting older.

Tests have shown that the chlorogenic acid itself is being changed intensively at the roasting temperature and is transformed into a mass of a bubbly-foamy dark-lacquery character. As this mass is melting at 205° C. and as the optimum roasting temperature is lying approximately at the same temperature, it seems plausible that this coffee constituent is deeply altered in the first place and that the increase in volume and the discolourment of the coffee beans while being roasted are caused mainly by the alteration of the chlorogenic acid during roasting.

Above it was shown that the chlorogenic acid content of the roasted coffee is lying between the wide limits of 5.72% and 7.29%. At the roasting temperature, therefore, different quantities of gaseous inclusions will be formed, the removal of which from the roasted beans which are not ground is rather difficult.

The ripening process of longer duration—e. g. 8 to 10 hours—and the vacuum treatment in combination with the pressure treatment by inert gases proposed by the invention make it possible to expel the noxious roasting products also from the unbroken beans. The gaseous inclusions do not remain in contact with the roasted coffee, as is the case in a known process where the coffee is ground, but they are entirely removed.

The containers destined for receiving the coffee are preferably filled with the kind of inert gas which is used in the previous treatment of the coffee.

The process may be carried through as follows:

The coffee beans roasted to the right chlorogenic acid content in the manner above described are kept in any suitable open container for about 8 to 10 hours subject to the influence of the air. Hereby a "ripening" of the beans is obtained mainly in the sense of an improvement of the aroma. Either before this ripening process or later the beans are subjected to a vacuum treatment of e. g. 70 to 100 millimeters in a closed vessel. This vacuum may be removed by introducing into the vessel an inert gas under pressure, e. g. carbon dioxid or nitrogen. This treatment may last about 4 to 5 hours. It may be effected in such a manner that the vacuum treatment and the pressure treatment are alternating introducing the inert gas by impulses into the vessel void of air and containing the coffee beans until e. g. a surpressure of 0.5 atmosphere has been reached thereupon removing again the pressure after short action by means of the vacuum pump. This is repeated preferably a number of times.

By such treatment it becomes possible to extract practically all of the gases from the beans without the necessity of breaking or crushing them.

Further the moisture taken up by the coffee during the ripening process is being removed, a fact which is of special importance.

The coffee thus treated is now packed in cans which preferably have been filled with carbon-dioxid.

I claim:

1. A process of roasting coffee to improve the keeping qualities thereof which comprises roasting the coffee beans to a chlorogenic acid content, which is approximately equal to the average chlorogenic acid contents between the values of the chlorogenic acid content ascertained in green and fully roasted coffee of the same type and then subjecting said coffee beans to a ripening process.

2. A process of roasting coffee to improve the keeping qualities thereof which comprises roasting the coffee beans to a chlorogenic acid content, which is approximately equal to the average chlorogenic acid content ascertained in green and fully roasted coffee of the same type and then subjecting said coffee beans to a ripening process for a period extending from 8 to 10 hours.

3. A process of roasting coffee to improve the keeping qualities thereof which comprises roasting the coffee beans to a chlorogenic acid content, which is approximately equal to the average chlorogenic acid content between the values of the chlorogenic acid content ascertained in green and fully roasted coffee of the same type, then ripening said coffee beans, and then subjecting said coffee to an alternate vacuum and pressure treatment.

4. A process of roasting coffee to improve the keeping qualities thereof which comprises roasting the coffee beans to a chlorogenic acid content, which is approximately equal to the average chlorogenic acid content between the values of the chlorogenic acid content ascertained in green and fully roasted coffee of the same type, then subjecting said coffee beans to an alternate vacuum and pressure treatment utilizing inert gases and then ripening said coffee.

5. A process of conserving roasted coffee in evacuated containers comprising roasting the coffee beans to a chlcrogenic acid content approximately equal to the average between the values of the chlorogenic acid content ascertained in green and fully roasted coffee of the same type, then subjecting said coffee to a ripening process for a period extending approximately from 8 to 10 hours, then subjecting said coffee to an alternate vacuum and pressure treatment utilizing an inert gas and then filling the containers with said coffee together with the same inert gas used in the treatment of said coffee beans.

6. The process of roasting coffee which includes the step of controlling the roasting of the coffee so as to secure roasted coffee having a chlorogenic acid content substantially equal to the average between the chlorogenic acid content of green and fully roasted coffee.

MAX SPECHT.

CERTIFICATE OF CORRECTION.

Patent No. 2,136,154.　　　　　　　　　　　　　　November 8, 1938.

MAX SPECHT.

It is hereby certified that error appears in the printed specification of the above numbered patent requiring correction as follows: Page 3, second column, line 61, claim 2, after "content" insert the words between the values of the chlorogenic acid content; and that the said Letters Patent should be read with this correction therein that the same may conform to the record of the case in the Patent Office.

Signed and sealed this 10th day of January, A. D. 1939.

(Seal)

Henry Van Arsdale
Acting Commissioner of Patents.